US 007707515 B2

(12) United States Patent  
Mistry

(10) Patent No.: US 7,707,515 B2  
(45) Date of Patent: Apr. 27, 2010

(54) DIGITAL USER INTERFACE FOR INPUTTING INDIC SCRIPTS

(75) Inventor: Pranav K. Mistry, Gujarat (IN)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/437,463

(22) Filed: May 19, 2006

(65) Prior Publication Data

US 2007/0174771 A1    Jul. 26, 2007

(30) Foreign Application Priority Data

Jan. 23, 2006    (IN) .......................... 167/DEL/2006

(51) Int. Cl.
*G06F 3/048* (2006.01)
(52) U.S. Cl. .................... 715/810; 715/773; 715/780
(58) Field of Classification Search ................. 715/773, 715/780, 810
See application file for complete search history.

(56) References Cited

U.S. PATENT DOCUMENTS

| 5,416,898 | A | * | 5/1995 | Opstad et al. ............... 345/468 |
| 6,002,390 | A | * | 12/1999 | Masui ........................ 345/173 |
| 6,286,064 | B1 | * | 9/2001 | King et al. .................... 710/67 |
| 7,187,365 | B2 | * | 3/2007 | Harman ....................... 345/171 |
| 7,319,957 | B2 | * | 1/2008 | Robinson et al. ............ 704/252 |
| 2005/0195171 | A1 | * | 9/2005 | Aoki et al. ................... 345/172 |
| 2005/0219218 | A1 | * | 10/2005 | Harman ....................... 345/169 |
| 2007/0033035 | A1 | * | 2/2007 | Sharma et al. .............. 704/245 |
| 2007/0156394 | A1 | * | 7/2007 | Banerjee et al. ................ 704/10 |
| 2008/0025613 | A1 | * | 1/2008 | Kumar et al. ............... 382/189 |
| 2009/0327313 | A1 | * | 12/2009 | Kung et al. .................. 707/100 |

* cited by examiner

*Primary Examiner*—William L Bashore
*Assistant Examiner*—David Phantana-angkool
(74) *Attorney, Agent, or Firm*—Senniger Powers LLP

(57) ABSTRACT

A system and method for displaying a base character in response to user input and displaying characters related to the base character to allow the user to select one of the displayed characters for a message string.

18 Claims, 20 Drawing Sheets

| | | | | | |
|---|---|---|---|---|---|
| a | ā | i | ī | u | ū |
| e | ai | o | | | |
| ka | kha | ga | gha | ṅa | |
| ca | cha | ja | jha | na | |
| ta | tha | da | dha | na | |
| ta | tha | da | dha | na | |
| pa | pha | ba | bha | ma | |
| ya | ra | la | la | va | |
| sa | sa | sa | ha | | |

FIG. 1A

| ka | kā | ki | kī | ku | kū | ke | ko | kaṁ |
|---|---|---|---|---|---|---|---|---|
| la | lā | li | lī | lu | lū | le | lo | laṁ |

FIG. 1B

| velars | DEV | GUJ | PUN | BEN | ORI | TIB | TEL | KAN | TAM | MAL | SIN | BUR | LAO | THA | KHM | JAV | BAL | TAG | BAT | BUG |
|---|---|---|---|---|---|---|---|---|---|---|---|---|---|---|---|---|---|---|---|---|
| k | क | ક | ਕ | ক | ଚ | ཀ | క | ಕ | க | ക | ක | က | ກ | ก | ក | ꦏ | ᬓ | ᜃ | ᯂ | ᨀ |
| kh | ख | ખ | ਖ | খ | ଖ | ཁ | ఖ | ಖ | – | ഖ | ඛ | ခ | ຂ | ข | ខ | ꦏ | – | – | – | – |
| g | ग | ગ | ਗ | গ | ଗ | ག | గ | ಗ | – | ഗ | ග | ဂ | ག | ค | គ | ꦒ | ᬕ | ᜄ | ᯄ | ᨁ |
| gh | घ | ઘ | ਘ | ঘ | ଘ | – | ఘ | ಘ | – | ഘ | ඝ | ဃ | – | ฆ | ឃ | ꦓ | ᬖ | – | – | – |
| n | ङ | ઙ | ਙ | ঙ | ଙ | ང | ఙ | ಙ | ங | ങ | ඞ | င | ງ | ง | ង | ꦔ | ᬗ | ᜅ | ᯅ | ᨂ |

FIG. 2

| Vowels | DEV | GUJ | PUN | BEN | ORI | TEL | KAN | TAM | MAL | SIN | URD | SIND |
|---|---|---|---|---|---|---|---|---|---|---|---|---|
| ka | क | ક | ਕ | ক | କ | క | ಕ | க | ക | ක | ک | |
| kā | का | કા | ਕਾ | কা | କା | కా | ಕಾ | கா | കാ | කා | کا | |
| kæ | – | – | – | – | – | – | – | – | – | කැ | – | |
| kǣ | – | – | – | – | – | – | – | – | – | කෑ | – | |
| ki | कि | કિ | ਕਿ | কি | କି | కి | ಕಿ | கி | കി | කි | کِ | |
| kī | की | કી | ਕੀ | কী | କୀ | కీ | ಕೀ | கீ | കീ | කී | کی | |
| ku | कु | કુ | ਕੁ | কু | କୁ | కు | ಕು | கு | കു | කු | کُ | |
| kū | कू | કૂ | ਕੂ | কূ | କୂ | కూ | ಕೂ | கூ | കൂ | කූ | کو | |
| kṛ | कृ | કૃ | – | কৃ | କୃ | కృ | ಕೃ | – | കൃ | කෘ | – | |
| kṝ | कॄ | કૄ | – | কৄ | କୄ | కౄ | ಕೄ | – | കൄ | කෲ | – | |
| ke(s) | कॆ* | – | – | – | – | కె | ಕೆ | கெ | കെ | කෙ | – | |
| ke/ē | के | કે | ਕੇ | কে | କେ | కే | ಕೇ | கே | കേ | කේ | کے | |
| kai | कै | કૈ | ਕੈ | কৈ | କୈ | కై | ಕೈ | கை | കൈ | කෛ | کَے | |
| ko(s) | कॊ* | – | – | – | – | కొ | ಕೊ | கொ | കൊ | කො | – | |
| ko/ō | को | કો | ਕੋ | কো | କୋ | కో | ಕೋ | கோ | കോ | කෝ | کو | |
| kau | कौ | કૌ | ਕੌ | কৌ | କୌ | కౌ | ಕೌ | கௌ | കൌ | කෞ | کَو | |
| kaḥ | कः | કઃ | ਕਃ | কঃ | କଃ | కః | ಕಃ | க: | കഃ | කඃ | – | – |
| kan | कं | કં | ਕं | কং | କଂ | కం | ಕಂ | – | കം | කං | کان | |
| kaṁ | कँ | કઁ | ਕਁ | কঁ | କଁ | – | – | – | – | – | (kān) | – |

| कै | के | को | कौ | कँ | कॉ |
|---|---|---|---|---|---|
| कि | का | की | कं | क्र | के |
| कु | क् | कू | कँ | कृ | कः |

$9^2$

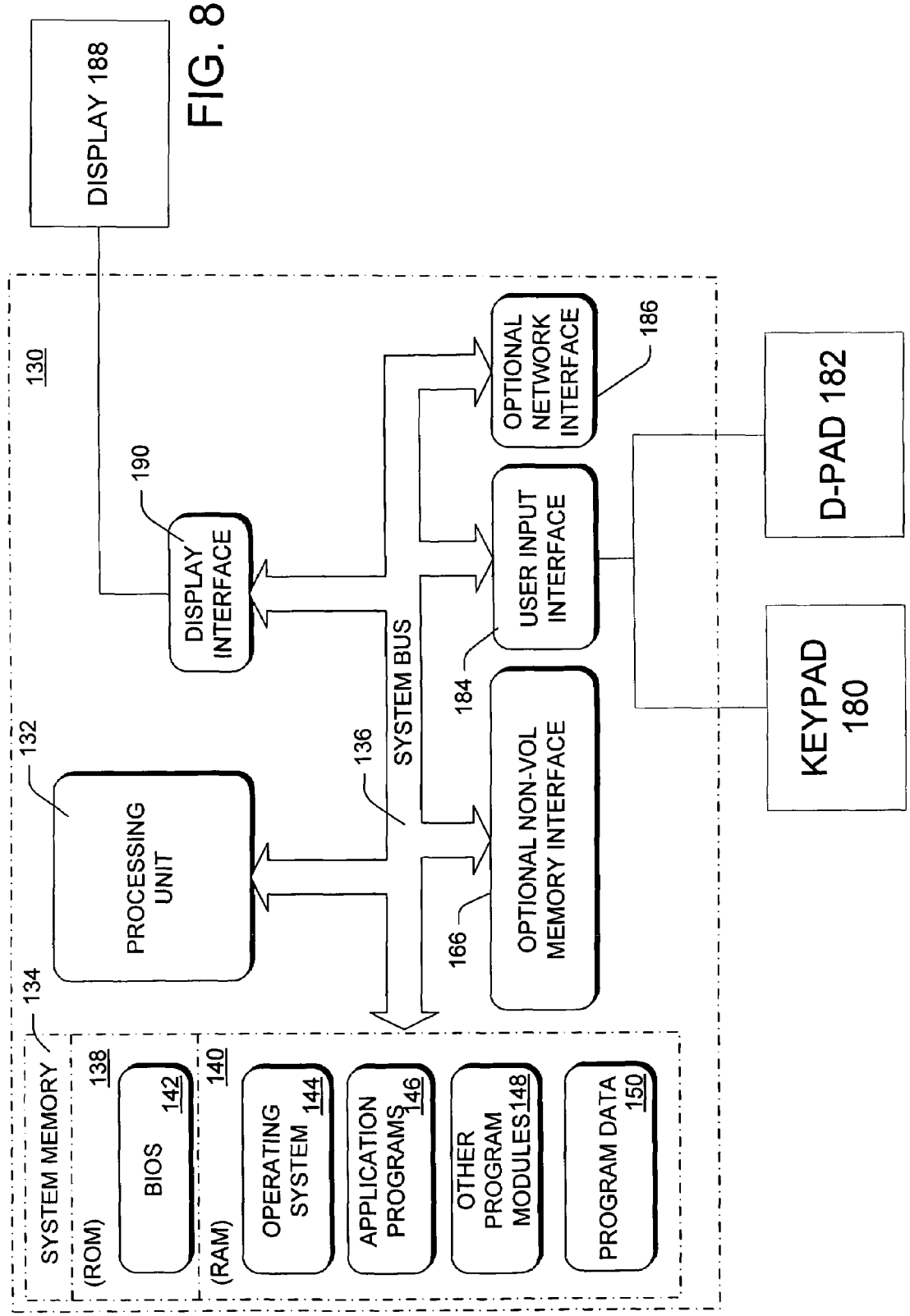

US 7,707,515 B2

DIGITAL USER INTERFACE FOR INPUTTING INDIC SCRIPTS

BACKGROUND OF THE INVENTION

Of India's nearly one thousand million people, a sizeable amount of over nine hundred million are currently excluded from participating in the so called information revolution—Internet and web, because of the absence of software and input mechanisms that can deal with information in the language which majority of the Indians speak. The mobile phone revolution has caught on in India. The number of handheld devices such as mobile phones that are currently available in India hugely outnumber the number of desktop computers and other computing mechanisms available in the country. However, the majority of the handheld devices and mobile phones in particular still use English as the input and interaction medium. A small number of mobile phone manufacturers have come up support for a couple of Indic languages in their phones. Unfortunately, inputting text using one of these mechanisms is a real challenge even for experienced mobile users. There is a need for a mechanism that can be used to input languages derived from Brahmi scripts (Indic scripts) on devices which do not have a full-fledged QWERTY keyboard.

SUMMARY OF THE INVENTION

Embodiments of the invention include a system and method for displaying a base character in response to user input and displaying characters related to the base character to allow the user to select one of the displayed characters for a message string.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 1A illustrates the basic standalone vowels and consonants in Brahmi script. The consonants in Brahmi script can be grouped into groups of 5 consonants each as shown in FIG. 1A.

FIG. 1B illustrates the example of strokes added or appended to indicate different vowels following the consonants क and ल.

FIG. 2 shows an example of the first five basic consonants used in the Brahmi script rendered differently in some other Indic scripts.

FIG. 3 illustrates the consonant-vowel combinations in different Indic scripts for the letter क.

FIG. 6B shows an example that when the previously typed letter was क and the user presses number 9 on the keypad one time, then the user would see the resulted grid of vowels and special character groups(as shown in FIG. 6A) that gets applied to क..

FIG. 8 is a block diagram illustrating one example of a suitable computing device environment in which the invention may be implemented.

Corresponding reference characters indicate corresponding parts throughout the drawings.

DETAILED DESCRIPTION

Figure 4A:
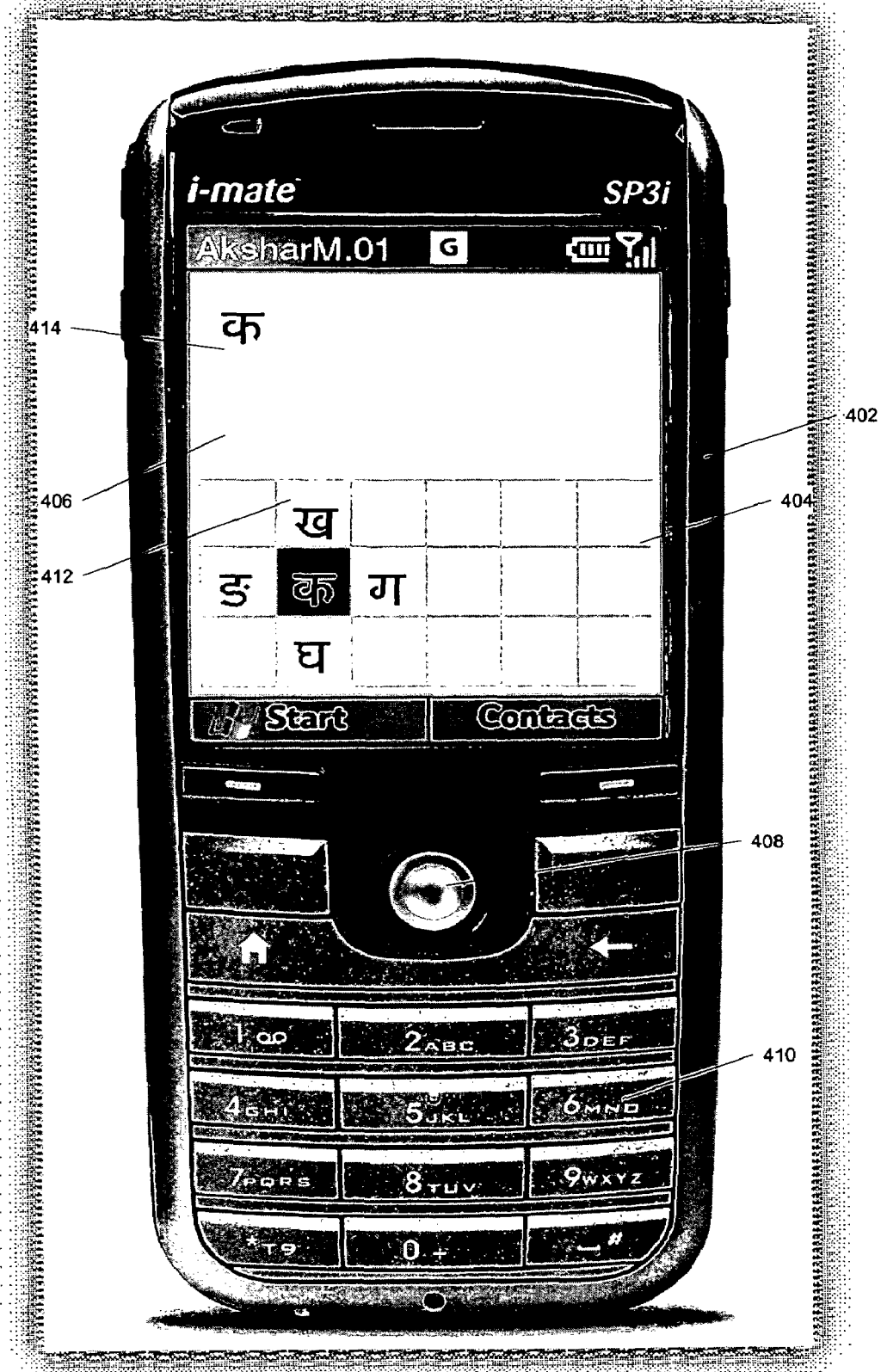
FIGS. 4A and 4B illustrate what a user would see when 2 is pressed on the keypad of a cell phone, the screen providing the user visual feedback and the text display area, according to one embodiment of the invention.

India has a diverse list of spoken languages among different groups of people. At least 30 different languages and around 2000 dialects have been identified. India is a multilingual country with more than 20 officially recognized languages. Of these, some are of Perso-Arabic origin with writing rules similar to Arabic. However a vast majority of the others are derived from the ancient Brahmi script as shown in FIG. 1A. Around the world, the percentage of people who speak languages that use scripts derived from Brahmi scripts is also as huge as 22 percent. This is also an advantage as far as the input mechanism according to one embodiment of the invention is concerned since the same mechanism can be used to input a large number of scripts with some parameterization of the software.

In Brahmi script, alphabets (vowels and consonants) are phonetically classified. Vowels and consonants combine together to describe a word in the language. The shapes of these vowels and consonants could be different in different Brahmi derived scripts, but their base is still the same. In addition to vowels and consonants there are a few graphical symbols that are used for nasalization of vowels. As shown in FIG. 1A, there also exist basic standalone vowels in Brahmi script. The consonants in Brahmi script can be grouped phonetically into groups of 5 consonants each as shown in FIG. 1A.

FIG. 2 shows how five of the basic consonants used in the Brahmi script, shown in the left most column, are rendered differently in each of 20 other Indic scripts.

A single syllable used in an Indian language consists of either a lone vowel optionally followed by a graphical symbol or a consonantal syllable consisting of a consonant followed by a vowel and optionally followed by one or more graphical symbols. It is also possible to have two or more consonants in a syllable. This methodology of having consonants and vowels is unique to scripts that are derived from the Brahmi language. FIG. 3 illustrates the consonant-vowel combinations for the letter क..

Non-keyboarded devices like mobile phones, personal digital assistants (PDA), Kiosk booths, TV that allow some inputs through remotes etc. are becoming popular. These devices have good mechanisms (i.e. multitapping, T9) for inputting English languages through a number-pad. However, using the same mechanism to input Indic scripts is a challenge because of the huge matrix of consonant-vowel and consonant-consonant-vowel combinations that are possible in Indian languages, as illustrated in FIGS. 1A, 1B, 2 and 3.

The most common method for inputting English in a mobile phone is the "abc" (multi-tapping) input mechanism. Here the user types the letter 2 on the number-pad thrice in succession (with as little time gap as possible to avoid timeouts) to enter the character 'c'. If a similar mechanism was used for inputting Indic languages then it would require having 5 consonants (more in some cases) on each number of the keypad and 12 (or more) vowels on the last keypad number. Because of timeout problems, entering these characters could become cumbersome in case a mistake is made. For example, if a user wants to enter the standalone vowel which comes 7th in the vowel list, then the user needs to tap a number on the keypad 7 times. In addition, the user needs to enter the numbers quickly (so as to avoid the timeout problem). In case the user tapped the keypad 8 times by mistake, then the user needs to add 12 more taps to come back to the correct character again.

According to one embodiment, the invention uses the arrow keys available in handheld devices such as mobile phones and TV remotes in addition to the number keypad available on these devices. According to one embodiment, since Indic languages have a grouping of consonants into groups of 5, a group of characters is assigned to each of the numbers on the keypad. FIG. 4A illustrates a cell phone 402 employing one embodiment of the invention. The user is given visual feedback in a 6×3 grid 404 at the bottom of a screen 406. Up-down-left and right arrow keys on a D-pad 408 are used to traverse through the grid. As used herein, D-pad (or direction pad) is an exemplary embodiment of up-down-left-right arrow keys and a central ok (select) key. In general, it is contemplated that any type of keypad or touch screen or other selection device may be employed in addition to or in place of the D-pad. When a particular number on a keypad 410 is entered, the user sees all the possible vowels/consonants that can be entered using that number in the grid 404. For example, when the number 2 on the keypad 410 is entered, the screen 406 provides the grid 404 as visual feedback as shown in FIG. 4A. In particular, the character corresponding to number 2 and the related characters which are part of the group as shown in an array within the grid 404.

Figure 4B:
Figure 5A:
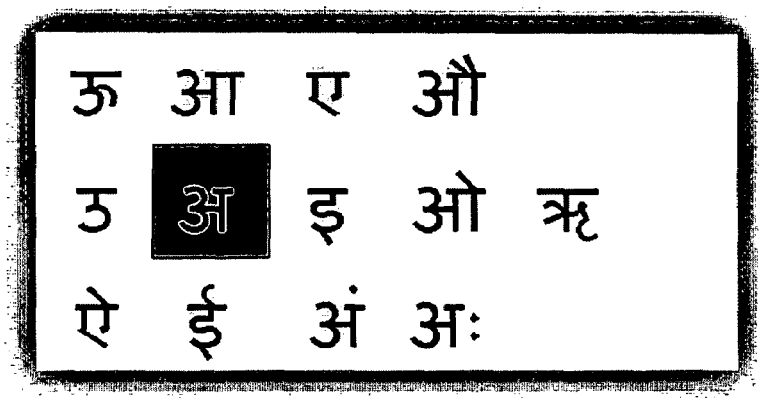
FIGS. 5A-5H show the grids of the visual feedback region that gets displayed to the user for each number on the numberpad of the device, when the user has selected Hindi as the language. Hindi is used herein as one embodiment of an exemplary language and is not intended to limit the embodiments of the invention. It is contemplated that other languages may be used with respect to various embodiments of the invention.
Figure 5B:
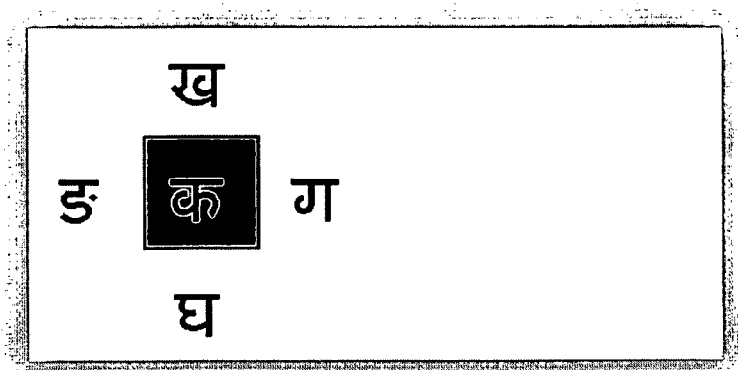
Figure 5C:
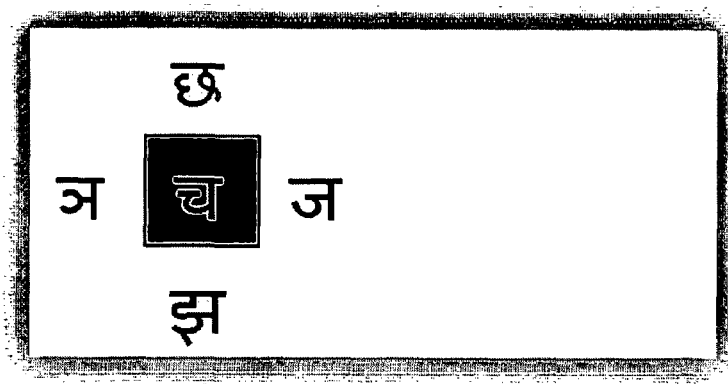
Figure 5D:
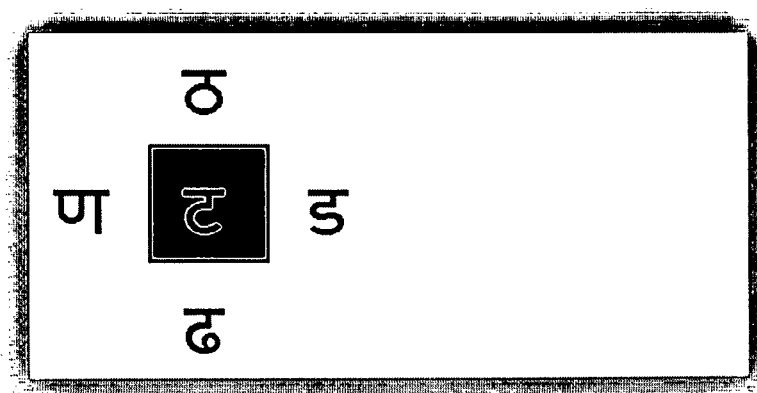
Figure 5E:
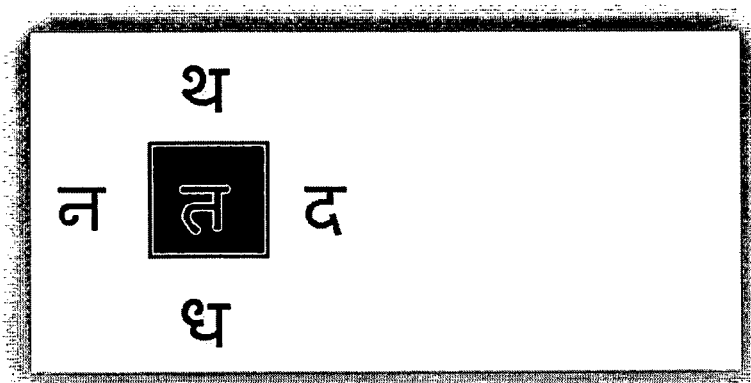
Figure 5F:
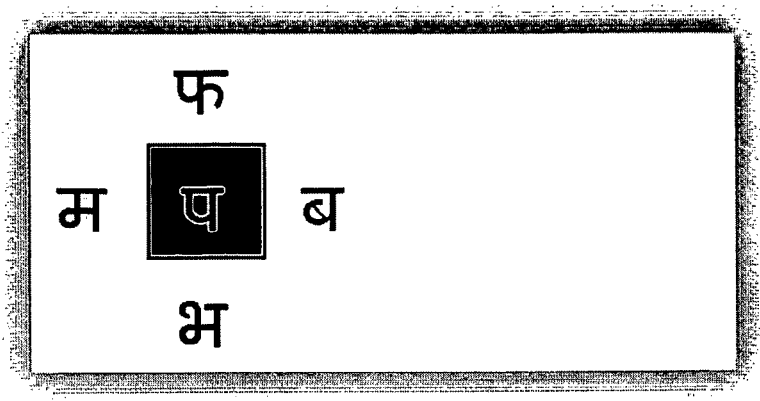
Figure 5G:
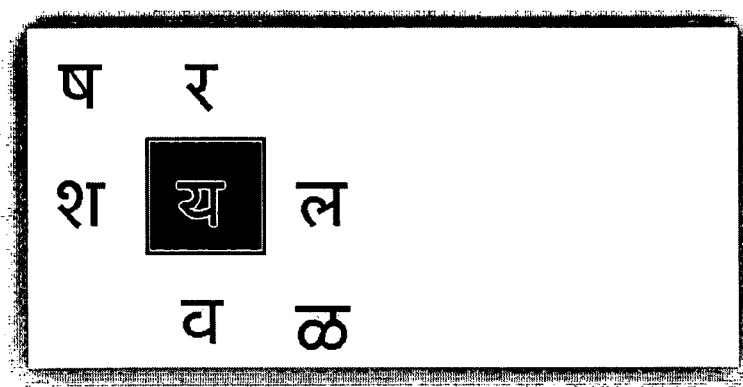
Figure 5H:
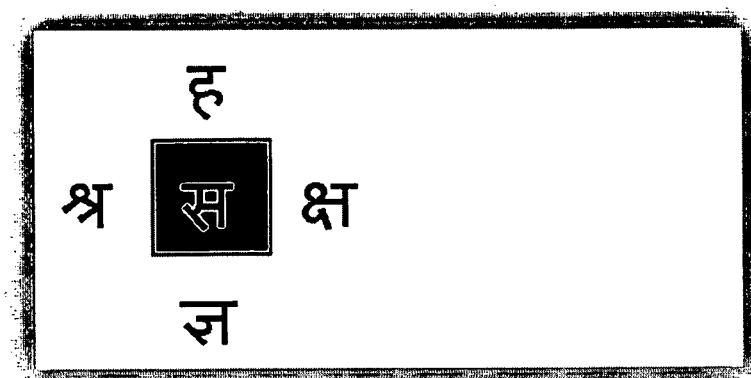

The D-pad 408 (or arrow keys on the device) can then be used to select the actual character that is desired from the list of available characters displayed in the grid 404. For example, if the user wants to enter the letter ख shown at 412, then the user types 2 on the keypad (which shows क and all other consonants in its group) followed by the up arrow key, which would select ख as shown in FIG. 4B. The user selects this character by pressing OK(or by pressing any number key on the keypad) on the D-pad 408 so that the character appears as a first character in a string 414 which would eventually be a message to be transmitted or a string to be saved (such as someone's name or address). In general, to select a character from the grid, the user navigates to the character with the use of D-pad and then presses OK, or presses any number key on the keypad. The last character will be appended to the existing message text in both cases.

Thus, as shown in FIGS. 4A and 4B, a first display area is the grid 404 having a central area and peripheral areas 412 spaced about the central area and wherein the first character क is displayed in the central area and the first additional characters are displayed in the peripheral areas 412.

FIGS. 5A-5H show the grids that gets displayed to the user for each number on the number-pad of the device.

The mechanism for entering vowel Matras according to one embodiment of the invention is shown in FIGS. 6A-6D.

FIG. 6B shows the grid that gets displayed to the user when the number 9 on the keypad is entered one time.

FIG. 6B shows that when the previously typed letter was क and the user enters number 9 one time then the user would see the combination in the previously typed letter (क for example) and the characters corresponding to the number 9 on the keypad.

Figure 6A:
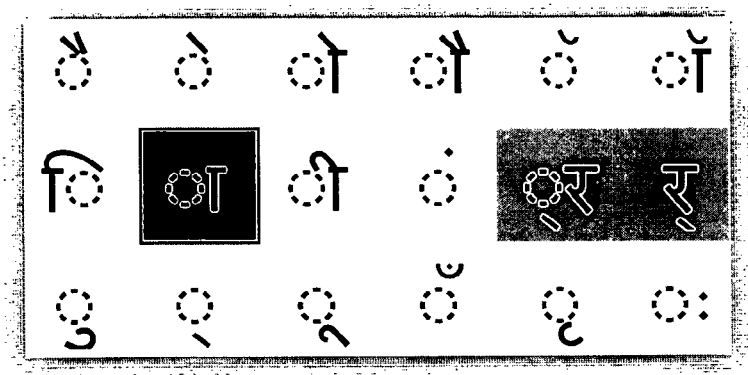
FIG. 6A shows the grid of vowels and some special character groups that gets applied to the previously entered character by the user, when the user presses 9 on the keypad.
Figure 6B:
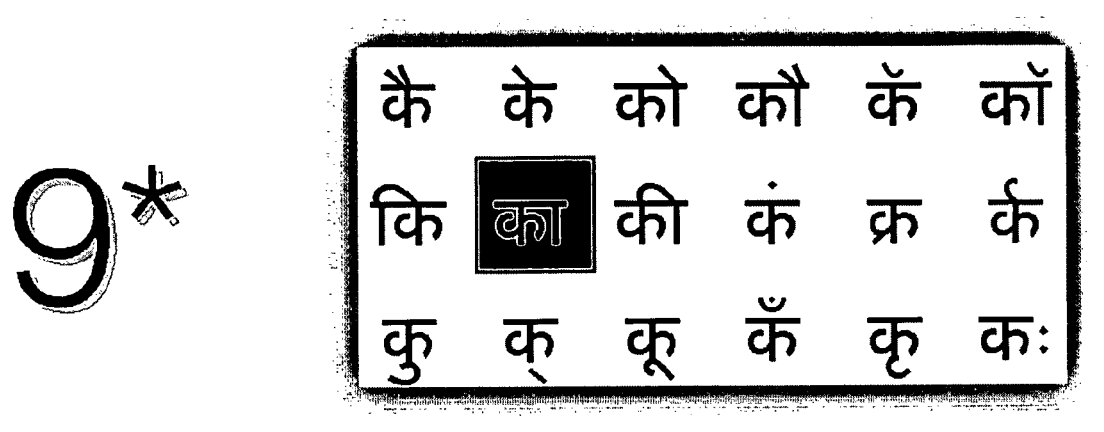

FIG. 6A shows the vowel and some other special character groups which will be applied when 9 is pressed. The grid lines are illustrative of the character display areas and would not usually be displayed to the user.

Figure 6C:
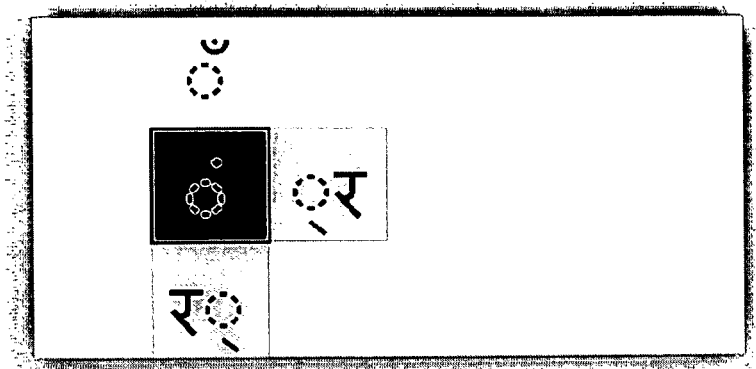
FIG. 6C shows the grid of vowels and some special character groups that gets applied to the previous character manipulated (by pressing 9 on keypad once and selecting one of the resulted output) by the user, when the user presses 9 on the keypad a second time in succession.
Figure 6D:
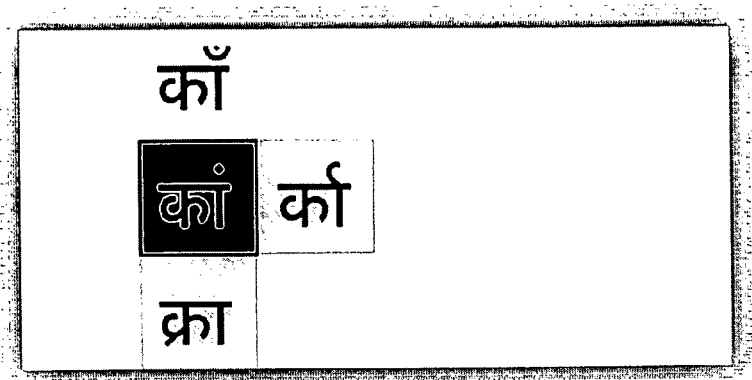
FIG. 6D shows an example that when the user enters number 9 second time in succession, (the display after entries is shown in FIG. 6B), then the user would see the resulted grid of vowels and special character groups (as shown in FIG. 6C) that gets applied to result of the previously resulted character. (This example uses the reference of earlier example with letter क as the first inserted character, and then pressed 9 on keypad twice)

FIG. 6D shows the grid that gets displayed to the user when the number 9 on the keypad is entered a second time in succession and a particular character is selected.

FIG. 6D shows that when the user enters number 9 a second time in succession, then the user would see the combination in the previously typed letter and the characters corresponding to the number 9 on the keypad.

FIG. 6C shows the vowel and some other special character groups which will be applied when 9 is pressed second time. The grid lines are illustrative of the character display areas and would not usually be displayed to the user.

In case of vowel Matras, slightly more feedback is provided to the user by showing the rendered form of the previous consonant that was entered by the user with the different Matras that are available in the grid. For example, as shown in FIG. 6B, if the previously typed letter was क,then the user would see the combination in the grid when the user types in the number 9 on his keypad.

FIGS. 6C and 6D show how the visual grid would look when the digit 9 is entered the second time.

Figure 7:
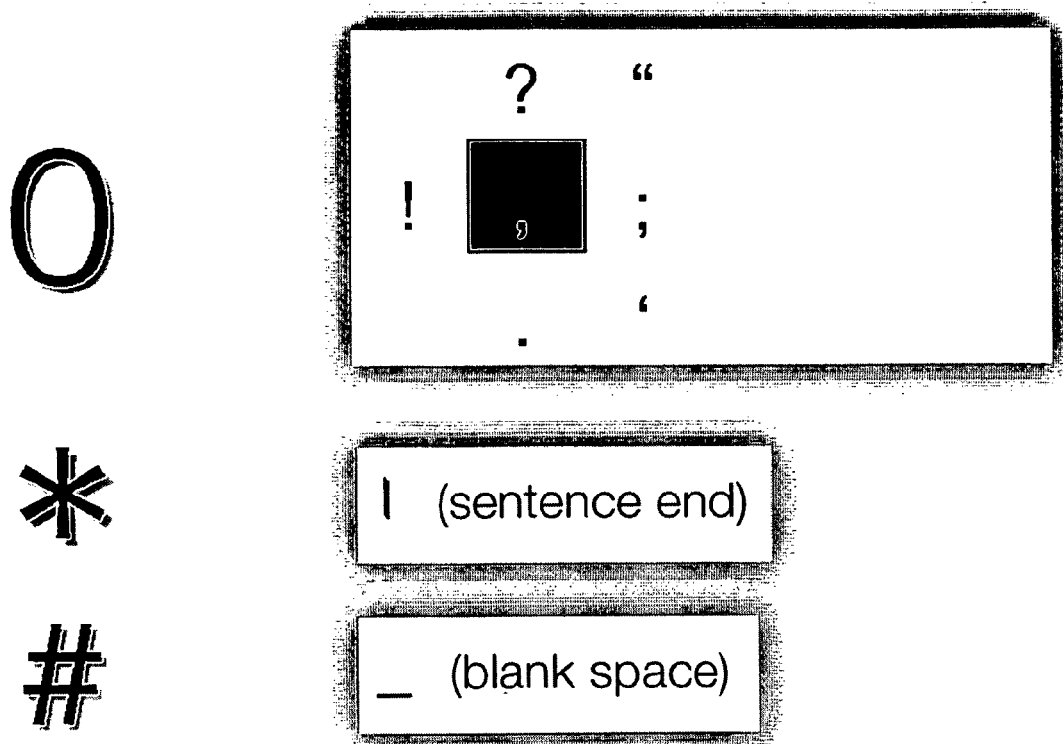
FIG. 7 illustrates that some commonly used signs and symbols (like question mark, comma, etc) are mapped on the remaining keys of the keypad. Pressing * will insert the sentence end symbol to the inserted text and # will insert a blank space.

FIG. 7 illustrates that some commonly used signs and symbols (like question mark, comma, etc) are mapped on the remaining keys of the keypad.

As another example, in order to type the letter खि the user has to type the number 2 on the keypad followed by the up arrow key (to select ख) followed by the number 9 on the keypad(which shows all possible Matra combinations of ख) followed by the left arrow key to form खि..

This input mechanism according to one embodiment of the invention provides several advantages. As described above, it can be implemented without the need for timeouts to change character selection options. Thus, there are no timeout problems according to one embodiment of the invention since the user uses the arrow keys on the device to select the character (unlike multi-tapping where the same key has to be tapped multiple times in order to select a particular character). The method also provides clear visual feedback to the user and reduces the number of clicks in order to select a particular vowel or consonant. Method of selecting a group of 5 characters with the use of a keypad number, provides a clear mental model, since the model (phonetically classified consonants in Indic Scripts) used here is exactly the same as the model that people learn in their schools. All these unique features of the mechanism ensure a smaller learning curve to the user. Consequently, the invention is simple to use, even for novice users.

This mechanism could also be combined with other input mechanisms like T9 in order to make it even more powerful. Providing word-prediction and dictionary support to the method could also be possible.

In summary, in one embodiment the invention comprises a device such as a cell phone 402 having a graphical user interface including a display 406 and a user interface selection device (key pad 410). A method is provided to allow a user to select Indic script characters to form a string of characters (message 414). An input is received from the user via the keypad 410. For example, the user presses a number indicative of a first character. A first display area (grid 404) presents a plurality of characters corresponding to the first character. The user selects via the keypad 410 one of the plurality of characters in the second display area (e.g., character 412). The selected character is displayed in a second display area as part of the message 414.

FIG. 8 shows one example of a computing device 130 which may use the invention. Some embodiment of the invention will be useful in the digital devices such as cell phones, smart phones, interactive TV devices or other devices where the main input mechanism is the number-pad with up-down-left-right and center OK controls, besides a general purpose computing system. In one embodiment of the invention, a computer such as the computing device 130 is suitable for use in the other figures illustrated and described herein. Computing device 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 130 optionally has at least some form of computer readable media. Computer readable media, which include both volatile and nonvolatile media, removable and non-removable media, may be any available medium that may be accessed by computing device 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 optionally includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computing device 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computing device 130 may also include a non-volatile memory interface 166 for other removable/non-removable, volatile/nonvolatile computer storage media.

A user may enter commands and information into computing device 130 through input devices or user interface selection devices such as a keypad 180 and a D-pad 182 or other pointing device (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A display 188 or other type of display device is also connected to system bus 136 via an interface, such as a display interface 190. In addition to the display 188, computing devices often include other peripheral output devices (not shown) such as a printer and speakers, which may be connected through an output peripheral interface (not shown).

The computing device 130 may operate in a networked environment using logical connections to one or more remote computers via a network interface 186. Such networking environments are commonplace in offices, enterprise-wide computer networks, intranets, and global computer networks (e.g., the Internet).

Generally, the data processors of computing device 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computing device 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. In a device having a graphical user interface including a display and a user interface selection device, a method of allowing a user to select Indic script consonants for inclusion in a string of characters comprising consonants and vowels of indic script, said method comprising:

receiving an input from the user via the user interface selection device, said input indicative of a first individual consonant of Indic script;

providing a first display area presenting a grid comprising the first individual consonant and further comprising a plurality of first additional individual consonants of Indic script corresponding phonetically to the received input indicative of the first individual consonant, wherein the grid has a central area for displaying the first individual consonant and a plurality of at least four peripheral areas contiguous with the central area, each peripheral area displaying one of the plurality of first additional consonants phonetically related to the first individual consonant;

providing a second display area displaying a string of individual characters;

without displaying the first individual consonant in the second display area, permitting the user to navigate the grid one area at a time starting from the central area to any of the at least four peripheral areas and to select, via the user interface selection device, one of either the first individual consonant or one of the plurality of first additional individual consonants presented in the grid in the first display area; and displaying the selected individual consonant in the second display area as part of the string.

2. The method of claim 1 further comprising:
receiving additional input from the user via the user interface selection device, said additional input indicative of a second character;
providing in the first display area a second grid comprising a plurality of additional second characters corresponding to the second character;
permitting the user to navigate and to select via the user interface selection device one of the plurality of the additional second characters presented in the second grid in the first display area; and
displaying the selected character in the second display area as part of the string.

3. The method of claim 2 wherein the selected individual consonant is a first consonant and:
the second character is a vowel to be added or appended to the first consonant; or
the second character is a second consonant to be added or appended to the first consonant.

4. The method of claim 3 wherein the user interface selection device is a keypad and a D-pad, wherein said receiving steps comprise receiving input from the user via the keypad, and wherein said permitting the user to select comprises receiving input from the user via the D-pad.

5. The method of claim 4 wherein each grid has a central area and peripheral areas spaced about the central area and wherein a received character is displayed in the central area and additional characters related to the received character are displayed in the peripheral areas.

6. The method of claim 1 wherein the user interface selection device is a keypad and a D-pad, wherein said receiving comprises receiving input from the user via the keypad and wherein said permitting the user to select comprises receiving input from the user via the D-pad.

7. In a device having a graphical user interface including a display and a user interface selection key pad, a method of allowing a user to select Indic script characters to form a message, said method comprising:
permitting the user to select via the keypad a group of sequential individual characters of indic script, said group comprising a subset of characters of the indic script, said sequential individual characters being phonetically related;
providing a first display area presenting the selected group of sequential characters in a 2-dimensional (2D) array;
providing a second display area displaying a message;
without displaying any character of the selected group of sequential individual characters in the second display area, permitting the user to navigate the 2D array one character at a time and to select, via a user interface selection device, one of the characters presented in the 2D array in the first display area; and
displaying the selected individual character as a first character in the second display area as part of the message.

8. The method of claim 7 further comprising:
receiving additional input from the user via the keypad, said additional input indicative of a second group of individual characters of indic script;
providing in the first display area the selected second group of sequential characters;
permitting the user to select via the user interface selection device one of the individual characters of the second group of sequential characters presented in the first display area; and
displaying the selected individual character as a second character in the second display area as part of the message.

9. The method of claim 8 wherein the first character is a first consonant and the second character is:
a vowel to be added or appended to the first consonant; or
a second consonant to be added or appended to the first consonant.

10. The method of claim 9 wherein the user interface selection device is a D-pad, wherein said permitting the user to select comprises receiving input from the user via the D-pad.

11. The method of claim 10 wherein the 2D array comprises a grid having a central area and peripheral areas spaced about the central area and wherein one character of the selected group of characters is displayed in the central area and additional characters of the selected group of characters are displayed in the peripheral areas.

12. The method of claim 7 wherein the user interface selection device is a D-pad, wherein said permitting the user to select comprises receiving input via the D-pad.

13. The method of claim 7 wherein the 2D array comprises a grid having a central area and peripheral areas spaced about the central area and wherein one character of the selected group of characters is displayed in the central area and additional characters of the selected group of characters are displayed in the peripheral areas.

14. A device comprising:
a graphical user interface including a display and a user interface selection device, said display having a first display area and a second display area;
a processor controlling the display in response to the user interface selection device, said processor controlling the second display area to display a string of characters, said processor:
receiving an input from the user via the user interface selection device, said input indicative of a first group of characters defined by the indic script, said first group of characters comprising at least five contiguous phonetically related characters;
without displaying any of the first group of characters in the second display area, controlling the first display area to present the first group of phonetically related characters to the user;
permitting the user to navigate the first group of characters one character at a time from any one character to any contiguous character and to select via the user interface selection device one of the characters of the first group of characters presented in the first display area;
displaying the selected first character in the second display area as part of the string;
receiving additional input from the user via the user interface selection device, said additional input indicative of a second group of characters;
providing in the first display area the indicated second group of characters;
permitting the user to select via the user interface selection device one character of the second group of characters presented in the first display area; and
displaying the selected second character in the second display area as part of the string.

15. The method of claim 14 wherein the first character is a first consonant and the second character is:
a vowel to be added or appended to the first consonant; or
a second consonant to be added or appended to the first consonant.

16. The method of claim 15 wherein the user interface selection device is a keypad and a D-pad, wherein said receiving steps comprise receiving input from the user via the keypad and said permitting the user to select comprises receiving input from the user via the D-pad.

17. The method of claim 16 wherein the first display area is a grid having a central area and peripheral areas spaced about the central area and wherein one character of the first group of characters is displayed in the central area and additional characters of the first group of characters are displayed in the peripheral areas.

18. The method of claim 14 wherein the user interface selection device is a keypad and a D-pad, wherein said receiving comprises receiving input from the user via the keypad and said permitting the user to select comprises receiving input from the user via the D-pad, wherein the first display area is a grid having a central area and peripheral areas spaced about the central area and wherein one character of the first group of characters is displayed in the central area and additional characters of the first group of characters are displayed in the peripheral areas.

* * * * *